(12) United States Patent
Arnault et al.

(10) Patent No.: US 10,197,097 B2
(45) Date of Patent: Feb. 5, 2019

(54) COMPACT CLUTCH ROLLING BEARING

(71) Applicant: Aktiebolaget SKF, Goteborg (SE)

(72) Inventors: Benoit Arnault, Saint-Cyr-sur-Loire (FR); Philippe Walter, Fondettes (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/838,484

(22) Filed: Dec. 12, 2017

(65) Prior Publication Data

US 2018/0172076 A1     Jun. 21, 2018

(30) Foreign Application Priority Data

Dec. 16, 2016   (DE) ........................ 10 2016 225 214

(51) Int. Cl.
| | |
|---|---|
| *F16C 33/60* | (2006.01) |
| *F16C 33/58* | (2006.01) |
| *F16C 35/04* | (2006.01) |
| *F16C 19/16* | (2006.01) |

(52) U.S. Cl.
CPC ............ *F16C 33/60* (2013.01); *F16C 33/583* (2013.01); *F16C 33/586* (2013.01); *F16C 33/588* (2013.01); *F16C 35/045* (2013.01); *F16C 19/163* (2013.01); *F16C 2361/43* (2013.01)

(58) Field of Classification Search
CPC ..... F16C 33/60; F16C 33/588; F16C 2361/43
See application file for complete search history.

(56) References Cited

U.S. PATENT DOCUMENTS

| | | | | |
|---|---|---|---|---|
| 4,478,325 | A * | 10/1984 | Dagiel | F16D 23/14 |
| | | | | 192/98 |
| 4,969,755 | A * | 11/1990 | Parzefall | F16D 23/14 |
| | | | | 384/612 |
| 5,620,076 | A * | 4/1997 | Voit | F16D 25/083 |
| | | | | 192/111.14 |
| 6,126,324 | A * | 10/2000 | Ponson | F16C 27/066 |
| | | | | 192/110 B |
| 6,612,749 | B2 * | 9/2003 | Arnault | F16C 25/083 |
| | | | | 384/607 |
| 6,811,013 | B2 * | 11/2004 | Dittmer | F16D 23/14 |
| | | | | 192/98 |
| 6,854,578 | B2 * | 2/2005 | Dittmer | F16C 33/78 |
| | | | | 192/98 |
| 9,863,485 | B2 * | 1/2018 | Walter | F16C 35/06 |

(Continued)

FOREIGN PATENT DOCUMENTS

DE     102010010735 A1    9/2011

*Primary Examiner* — Thomas R Hannon
(74) *Attorney, Agent, or Firm* — Bryan Peckjian; SKF USA Inc. Patent Dept.

(57) ABSTRACT

A clutch rolling bearing centered on a central axis. The clutch rolling bearing includes a rotatable ring provided with a toroidal portion defining a first concave raceway and an engagement portion dedicated to cooperate with a diaphragm, a stationary ring mounted coaxially with the rotatable ring, provided with a toroidal portion defining a second concave raceway and dedicated to cooperate with a translating piston, and balls arranged between the first and second concave raceways of the rotatable and stationary rings. The engagement portion of rotatable ring extends from the toroidal portion on the diaphragm side, the engagement portion being folded against the toroidal portion on a surface radially opposite to the first raceway.

6 Claims, 3 Drawing Sheets

(56) References Cited

U.S. PATENT DOCUMENTS

2011/0303506 A1* 12/2011 Bussit .................. F16D 23/146
                                                    192/99 A
2012/0261227 A1* 10/2012 Arnault .................. F16D 23/14
                                                    192/82 R

* cited by examiner

COMPACT CLUTCH ROLLING BEARING

CROSS-REFERENCE TO RELATED APPLICATIONS

This application claims priority to German patent application no. 102016225214.3 filed on Dec. 16, 2016, the contents of which are fully incorporated herein by reference.

FIELD OF THE PRESENT INVENTION

The invention relates to the field of rolling bearings, in particular the invention applies to clutch bearing units whose race rings are made by cutting and stamping a sheet metal blank.

BACKGROUND

It is known to use clutch bearing units in the automotive applications for actuating a rotating diaphragm of a gearbox from a translating piston of a mechanical, hydraulic or electrical control element. To this end, the clutch bearing unit comprises a clutch rolling bearing with rolling elements, for example balls, a rotatable ring intended to be in contact with diaphragm, and a stationary ring provided with a bore receiving the translating piston. The rings are cut from a sheet metal blank, and then stamped to give their final tubular shape to the race rings, with a toroidal portion defining raceway surfaces for balls.

When a driver operates a clutch pedal, the piston is axially pushed towards the clutch bearing unit. The translating displacement is forwarded to the diaphragm that removes the coupling between the rotating diaphragm connected to the gearbox and a flywheel connected to the vehicle engine. The power torque is not transmitted between the gearbox and the engine, and the operation of clutching or declutching in the gearbox can be achieved. The clutch rolling bearing further adjusts misalignments between diaphragm and piston.

It is known from prior art, for example DE-A1-10 2010 010735, to axially extend the toroidal portion of the rotatable ring with an axial portion, the axial portion being further extended substantially radially by an engagement portion. The engagement portion defines a surface dedicated to come into contact with the diaphragm. The engagement portion is bent in respect with the axial portion and is obtained by stamping of the ring of tubular shape.

The axial portion ensures the rigidity of the rotatable ring for transmitting loads to the diaphragm. The engagement portion defines a large surface for ensuring the contact with the diaphragm even in case of relative axial displacement or sliding of the diaphragm in respect with the clutch rolling bearing.

However, the available space for the clutch rolling bearings in automotive applications tends to be more and more reduced both axially and radially, but with more loads to transmit through the clutch rolling bearing.

BRIEF SUMMARY OF THE PRESENT INVENTION

The aim of the invention is to solve the above difficulties by providing a clutch rolling bearing which is compact, of improved conception, economic and easy to manufacture.

To this end, the invention relates to a clutch rolling bearing centered on a central axis and comprising a rotatable ring provided with a toroidal portion defining a first concave raceway and an engagement portion dedicated to cooperate with a diaphragm, a stationary ring mounted coaxially with the rotatable ring, provided with a toroidal portion defining a second concave raceway and dedicated to cooperate with a translating piston, and balls arranged between the raceways of the rings.

According to the invention, the engagement portion of rotatable ring extends from the toroidal portion on the diaphragm side, the engagement portion being folded against the toroidal portion on a surface radially opposite to the first raceway.

According to further aspects of the invention which are advantageous but not compulsory, such a rolling bearing may incorporate one or several of the following features:

The rotatable ring is an outer ring and the stationary ring is an inner ring.

The rotatable ring is an inner ring and the stationary ring is an outer ring.

The balls are circumferentially equally spaced by a cage having an annular heel and a plurality of housings wherein the balls are arranged.

The clutch rolling bearing further comprises a flange provided with a substantial axial portion mounted on the surface radially opposite to the first raceway of rotatable ring and a collar radially extending from the substantial axial portion towards the balls and the stationary ring, the collar contacting an edge of the rotatable ring on the opposite side to the diaphragm.

The free end of the substantial axial portion of flange is clamped between the toroidal portion and the folded engagement portion of rotatable ring.

The engagement portion defines a surface dedicated to be in direct contact with the diaphragm.

The clutch rolling bearing further comprises a wear plate fixed to the folded engagement portion, the wear plate defining a surface dedicated to come into direct contact with the diaphragm.

The wear plate comprises a plurality of clips circumferentially distributed and cooperating with the free edge of the folded engagement portion.

The wear plate is made of thermoplastic material.

The flange is made of mild steel, in particular DC01 or DC04.

BRIEF DESCRIPTION OF THE DRAWINGS

The invention will now be explained in correspondence with the annexed figures, given as illustrating examples, in which.

DETAILED DESCRIPTION OF THE PRESENT INVENTION

Figure 1:
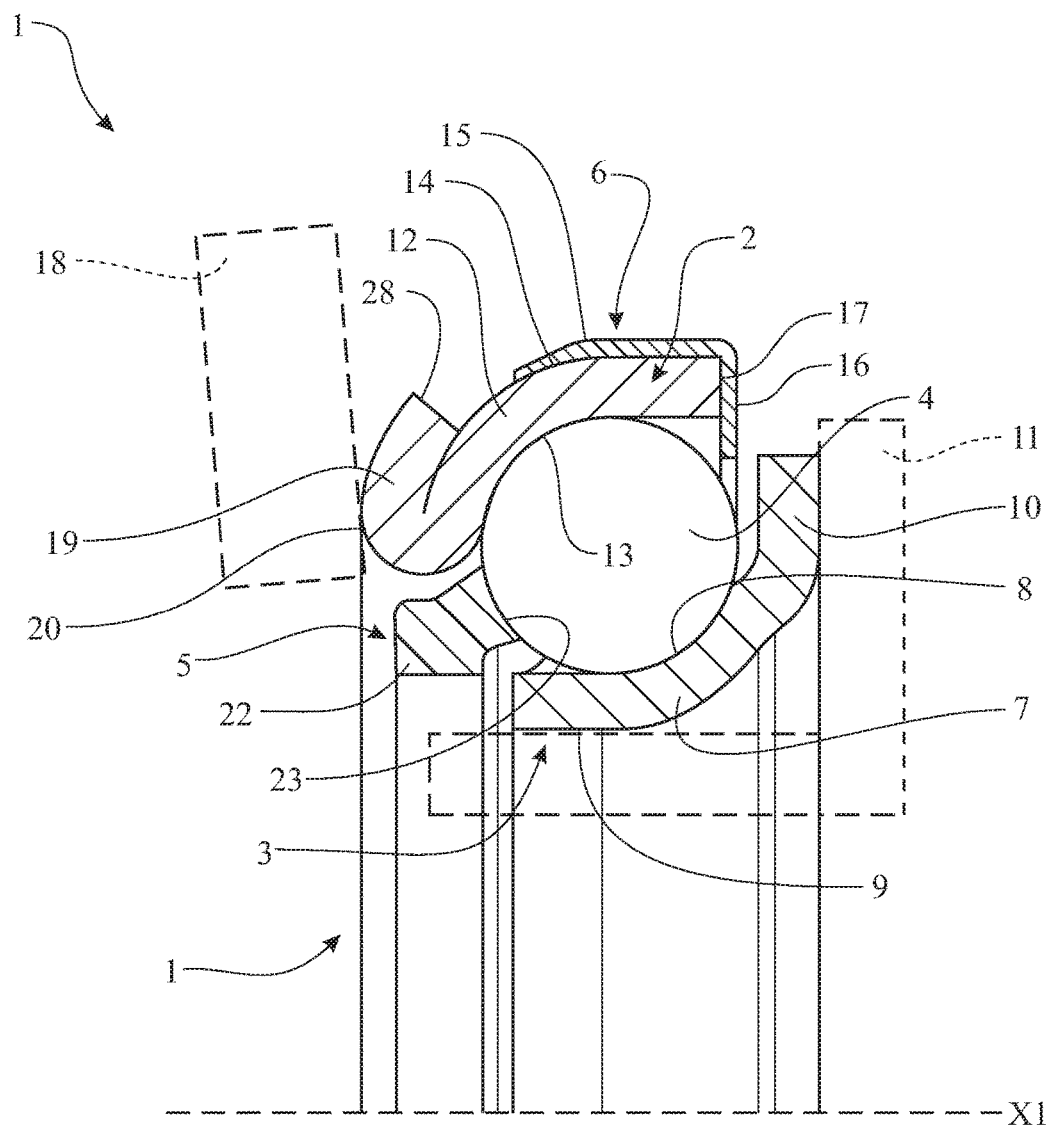
FIG. 1 is a cross-sectional view of a clutch rolling bearing according to a first embodiment of the invention.

FIG. 1 discloses a clutch rolling bearing 1 for use in a clutch bearing unit in the automotive applications. The rolling bearing 1 is suitable for use in any other application with rotating movement.

Rolling bearing 1 of central axis X1 comprises a rotatable outer ring 2, a stationary inner ring 3, a row of balls 4, a cage 5 to circumferentially maintain the balls 4, and a retaining flange 6 for the balls 4 that is secured to the outer ring 2.

The stationary inner ring 3 is of global tubular shape and extends along the central axis X1. The stationary inner ring 3 is provided with a toroidal portion 7. Toroidal portion 7 defines an outer surface forming a concave raceway 8 for the balls 4, and an inner surface forming a central bore 9 for the ring 3 and for the clutch rolling bearing 1. The stationary inner ring 3 further comprises an annular radial portion 10 extending outwardly radially from the toroidal portion towards an opposite direction to the central axis X1. The stationary inner ring 3 is advantageously actuated by a translating piston 11 illustrated in dashed line, that is inserted in the central bore 9 and axially abuts against the annular radial portion 10 to transmit an axial movement to the clutch rolling bearing 1.

The rotatable outer ring 2 is of global tubular shape and extends along the central axis X1. The outer ring 2 radially surrounds the inner ring 3, the balls 4 being radially arranged between the rings 2, 3.

The rotatable outer ring 2 comprises a toroidal portion 12 that defines an inner surface forming a concave raceway 13 for the balls 4, and an outer surface 14.

The flange 6 is mounted onto the rotatable outer ring 2 on the side of piston 11. Flange 6 is provided with a substantial axial portion 15 mounted on the outer surface 14 that is radially opposite to the raceway 13 of rotatable outer ring 2. Substantial axial portion 15 is of corresponding shape with the outer surface 14 of toroidal portion 12. As an alternate not shown, the free end of the substantial axial portion 15 of flange 6 is clamped between the toroidal portion 12 and the folded engagement portion 19 of rotatable outer ring 2.

The flange 6 further comprises a collar 16 radially extending from the substantial axial portion 15 towards the balls 4 and the stationary inner ring 3, the collar 16 contacting an edge 17 of the rotatable outer ring 2 on the side of piston 11.

The flange 6 is then fixed onto outer ring 2 and forms a retainer for the balls 4 in the clutch rolling bearing 1. As an alternate not shown, the flange 6 may comprise a sealing gasket with a lip in sliding contact with the stationary inner ring 3.

The flange 6 is preferably made of mild steel, in particular DC01 or DC04.

On the opposite axial side to the piston 11, a diaphragm 18 illustrated in dashed line is dedicated to come into contact with the rotatable outer ring 2 of clutch rolling bearing 1. To this end, the rotatable outer ring 2 is further provided with an engagement portion 19 dedicated to come into contact with the diaphragm 18.

According to the invention, the engagement portion 19 of rotatable outer ring 2 directly extends from the toroidal portion 12 on the side of diaphragm 18, i.e. on the opposite side to the piston 11 and the flange 6. Engagement portion 19 is folded against the toroidal portion 12 on the outer surface 14 that is radially opposite to the raceway 13.

The folded engagement portion 19 presents a surface 20 substantially in a radial plane and directed towards the diaphragm 18. In the embodiment of FIG. 1, the diaphragm comes into direct contact with the surface 20.

The cage 5 comprises an annular heel 22 and a plurality of housings 23 wherein are arranged the balls, the housings being separated each other by walls (not shown).

Heel 22 is axially facing the toroidal portion 7 of stationary inner ring 3, and more precisely the raceway 8. Heel 22 is further arranged in a bore defined by the fold of engagement portion 19. Cage 5 is then optimized to propose a compact design of clutch rolling bearing 1.

The engagement portion 19 is directly folded onto the toroidal portion 12. Then the rotatable outer ring 2 does not comprise any additional portion nor element. Thanks to the invention, the designs of the rotatable outer ring 2, and also of the cage 5 and the stationary ring 3, are optimized for a reduced axial compactness. The clutch rolling bearing 1 is compact and can be installed in applications of reduced available space.

Another advantage is that the rotatable outer ring 2 is prevented from any deformation due to high loads in the clutch application.

Figure 2:
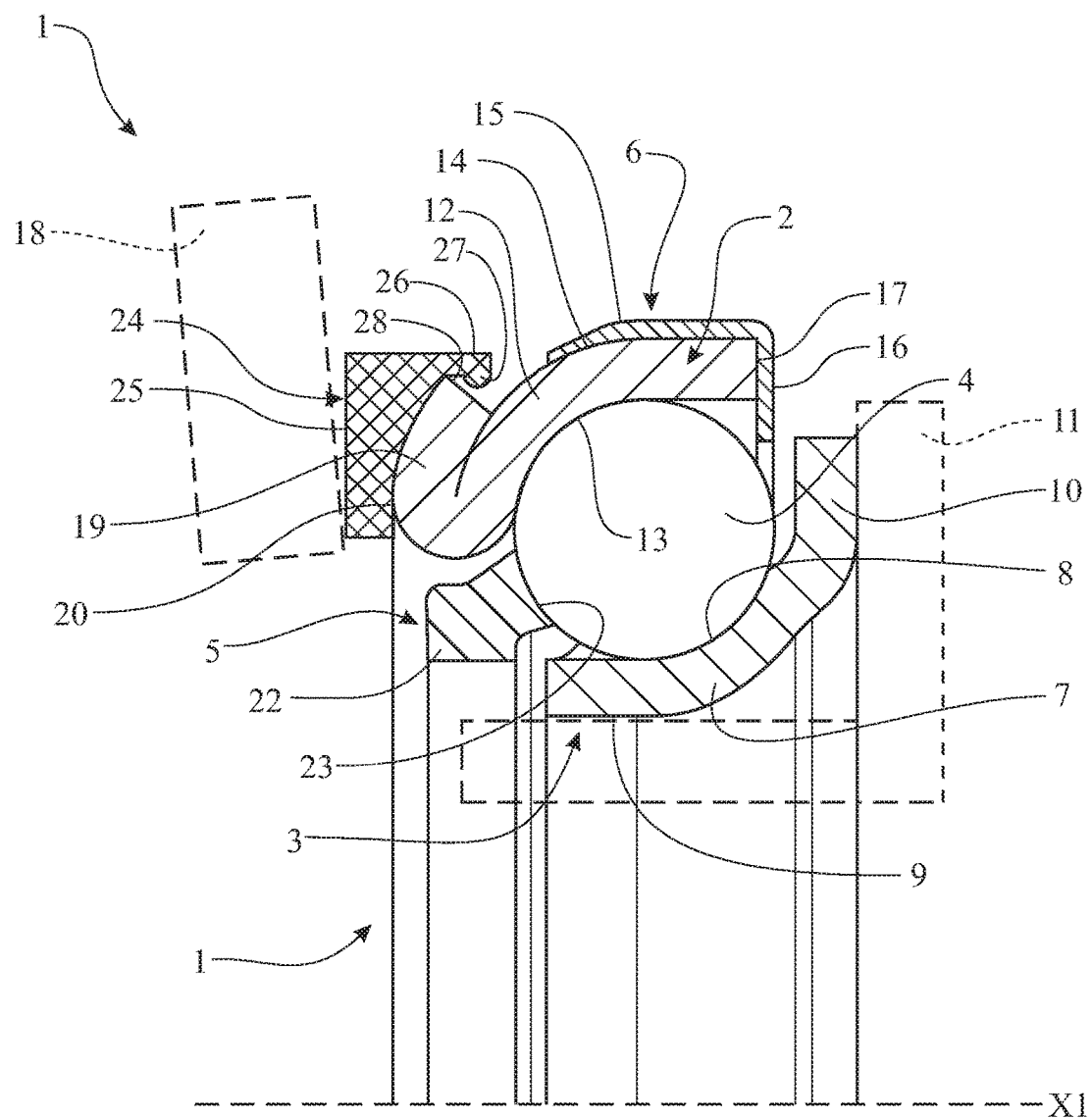
FIG. 2 is a cross-sectional view of a clutch rolling bearing according to a second embodiment of the invention.

A second embodiment of the invention is illustrated in FIG. 2, in which the same elements have the same reference signs, and differs from the previous embodiment in that the clutch rolling bearing 1 further comprises a wear plate 24 fast with the rotatable outer ring 2.

The wear plate 24 comprises a substantially radial extending portion 25 which covers the surface 20 of the folded engagement portion 19. The substantially radial extending portion 25 is dedicated to come into contact with the diaphragm 18 and forms an interface between the engagement portion 19, hence the rotatable outer ring 2, and the diaphragm 18.

On the diaphragm side, the substantially radial extending portion 25 is a planar surface. The opposite side of the wear plate 24 is formed having a shape that substantially corresponds with the engagement portion 19 of the rotatable outer ring 2, the opposite side having a substantial toroidal shape.

The outer annular periphery of the substantially radial extending portion 25 of wear plate 24 comprises a plurality of tongues 26 that axially extends from the portion 25 towards the rotatable outer ring 2. Each of the tongues 26 is provided with an inwards bulge 27 realized on an inner peripheral surface of the tongues. Alternatively, the wear plate 24 comprises an annular axial portion comprising a circumferential bulge.

Bulges 27 are engaged with a circumferential sharp edge 28 defined by the free end of the engagement portion 19. The free end being directed axially towards the opposite side to the diaphragm 18, the sharp edge 28 radially outwardly protrudes from the outer surface 14 of rotatable outer ring 2 and then forms a retainer for the bulges 27 that are clipped with.

The wear plate 24 is preferably made of thermoplastic material and prevent wear at the interface between the rotatable outer ring 2 and diaphragm 18.

As a benefit of this embodiment, the wear of clutch rolling bearing 1 is reduced. The wear plate 24 is mounted directly on rotatable outer ring 2 in a relatively fast and easy operation. The wear plate 24 can be further removed from outer ring 2 by moving tongues 26 with bulges 27 away from the sharp edge 28, by hand or by a specific tool, and then can be easily replaced during a maintenance process.

Figure 3:
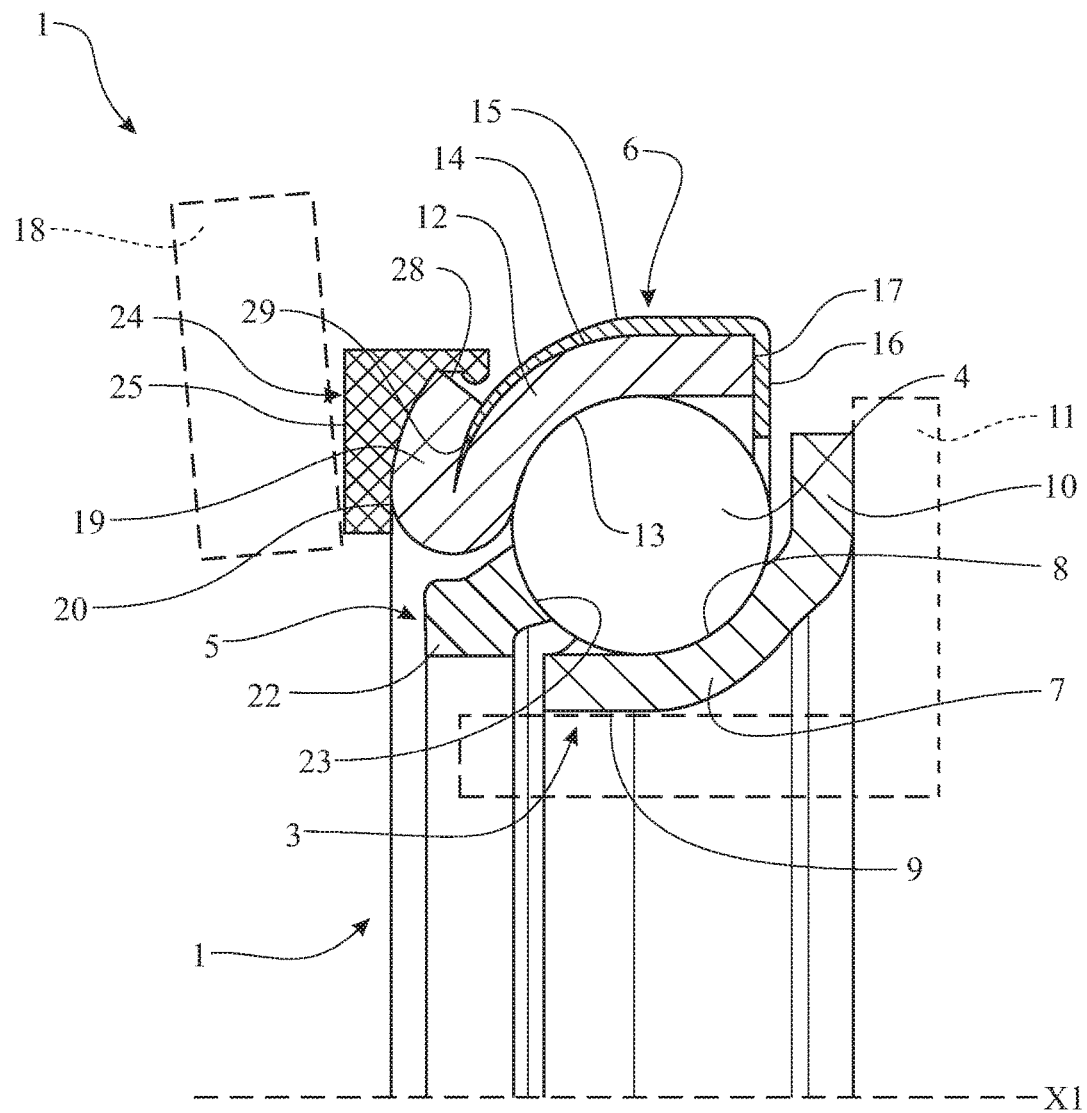
FIG. 3 is a cross-sectional view of a clutch rolling bearing according to a modified variant of the second embodiment originally introduced in FIG. 2.

A variant of the second embodiment, originally introduced in FIG. 2, is shown in FIG. 3. FIG. 3 discloses a clutch rolling bearing 1 wherein a free end 29 of the substantial axial portion 15 of the flange 6 is clamped between the toroidal portion 12 and the folded engagement portion 19 of the rotatable ring 2.

According to an alternate not shown, sharp edges may be discrete and distributed on the outer periphery of the engagement portion 19, the sharp edges being defined in recesses. It permits to prevent any relative rotation between the wear plate 24 and the rotatable outer ring 2.

As an alternate not shown, the wear plate 24 may be overmolded onto the surface 20 of the folded engagement portion 19.

The invention has been illustrated with a rotatable outer ring and a stationary inner ring. Alternatively, the outer ring may be stationary and the inner ring may be rotatable. In that case, the stationary outer ring cooperates with a piston and the rotatable inner ring cooperates with a diaphragm. According to another alternate embodiment, the protective flange may be mounted in the inner ring instead of the outer ring.

What is claimed is:

1. A clutch rolling bearing centered on a central axis, the clutch rolling bearing comprising:
   a rotatable ring provided with a toroidal portion defining a first concave raceway and an engagement portion dedicated to cooperate with a diaphragm;
   a stationary ring mounted coaxially with the rotatable ring, provided with a toroidal portion defining a second concave raceway and dedicated to cooperate with a translating piston; and
   balls arranged between the raceways of the rings,
   wherein the engagement portion of rotatable ring extends from the toroidal portion on the diaphragm side, the engagement portion being folded against the toroidal portion on a surface radially opposite to the first raceway.

2. The clutch rolling bearing according to claim 1, further comprising a flange provided with a substantial axial portion mounted on the surface radially opposite to the first raceway of rotatable ring and a collar radially extending from the substantial axial portion towards the balls and the stationary ring, the collar contacting an edge of the rotatable ring on the opposite side to the diaphragm.

3. The clutch rolling bearing according to claim 2, wherein the free end of the substantial axial portion of flange is clamped between the toroidal portion and the folded engagement portion of rotatable ring.

4. The clutch rolling bearing according to claim 1, wherein the engagement portion defines a surface dedicated to be in direct contact with the diaphragm.

5. The clutch rolling bearing according to claim 1, further comprising a wear plate fixed to the folded engagement portion, the wear plate defining a surface dedicated to come into direct contact with the diaphragm.

6. The clutch rolling bearing according to claim 5, the wear plate further comprising a plurality of clips circumferentially distributed and cooperating with the free edge of the folded engagement portion.

* * * * *